Patented Jan. 24, 1939

2,144,726

UNITED STATES PATENT OFFICE 2,144,726

PREPARATION OF STEROL DERIVATIVES

Russell Earl Marker, State College, Pa., assignor to Parke, Davis & Company, Detroit, Mich., a corporation of Michigan No Drawing. Application August 26, 1935, Serial No. 37,948

6 Claims. (Cl. 260—397)

The invention relates to sterol derivatives having a molecular ring structure or framework of the same type as cholesterol, but in which the unsaturated double bond of the cholesterol type has been saturated by hydrogen. The invention particularly has to do with the preparation of isomeric halogen derivatives of cholestanols (dihydrocholesterols) and the preparation therefrom of compounds resembling the male sex hormone.

It is known that cholesterol may be more or less readily obtained from various sources in nature and that it is an alcohol with the formula $C_{27}H_{46}O$. It is also known that the dihydro-derivative of cholesterol (beta-cholestanol, also an alcohol with formula, $C_{27}H_{48}O$) can be converted to its acetate and then the long aliphatic side chain oxidized off of the molecule to give the acetate of an oxy-ketone. By next hydrolyzing off the acetate group from this oxy-ketone there is obtained the oxy-ketone itself of formula $C_{19}H_{30}O_2$, which still retains the original cholesterol ring structure and is a stereo-isomer of the male sex hormone, androsterone. It has the same empirical formula as natural androsterone, which latter may be called, arbitrarily, cis-androsterone. (Ruzicka et al., Helv. Chim. Acta 17, 1389, 1395 (1934)). However, Ruzicka and his co-workers found that this stereo-isomer of androsterone (trans-androsterone) had only ¼ the physiological activity of the naturally occurring male sex hormone (cis-androsterone). Ruzicka then worked with a method, which he also described in the above reference, whereby he synthesized natural cis-androsterone, also by starting with cholesterol. In this synthesis, beta-cholestanol was first produced from cholesterol by hydrogenation of its double bond. In order to produce a steric re-arrangement in the position of the alcoholic hydroxyl group of the beta-cholestanol structure from the trans-position to the cis-position existing in cis-androsterone, it was necessary to carry through the following reactions:

1. Oxidation of beta-cholestanol with chromic acid to beta-cholestanone, whereby the possibility of isomerism at the carbon atom of the alcohol group of beta-cholestanol was destroyed by converting the alcohol group, —CHOH—, to the ketone group,

of beta-cholestanone.

2. Reduction of beta-cholestanone in butyl ether solution with hydrogen, using platinum as a catalyst, to obtain epicholestanol, whereby the ketone group of beta-cholestanone was changed back into an alcohol group having, however, the opposite spatial arrangement of the alcoholic OH-group to that present in beta-cholestanol, but being the same as that in cis-androsterone.

The epi-cholestanol obtained in step 2 was then converted by acetic anhydride to its acetate and the aliphatic side chain oxidized off of the acetate to produce the acetate of cis-androsterone, which was finally hydrolyzed to give cis-androsterone, identical with the naturally occurring male sex hormone. In both of the above steps, the yields are low. Step 2 is the weakest step in the chain of reactions described above for synthesizing cis-androsterone. In carrying out step 2, one is limited because of the very slight solubility of beta-cholestanone in butyl ether, to the use of very small amounts of beta-cholestanone at any given time. Moreover, it is also necessary to use an amount of platinum oxide equal to ⅕ the weight of the beta-cholestanone to be reduced. Due to the great expense, particularly with regard to the platinum catalyst used, the handling of large amounts of butyl ether and the necessity for repeating step 2 many times in order to obtain appreciable quantities of epi-cholestanol with the use of apparatus of ordinary size, this synthesis of cis-androsterone has only been of scientific interest and has not been put to any practical use.

I have now found that by the action of a thionyl halide upon beta-cholestanol (with the alcoholic OH in the trans-position) or upon epi-cholestanol (with OH in the cis-position) that the cholestanols are directly converted in each case to halides wherein the alcoholic OH group has been replaced by a halogen atom with simultaneous inversion (Walden inversion) so that the halogen atom is in the opposite steric relationship, to that which was the case with the hydroxyl group of the original alcohol.

I have further found that my method for the production of isomeric halogeno-cholestanes, when used for the production of epi-halogeno-cholestanes, constitutes the first step in a new simplified method for the preparation of cis-androsterone as well as new halogeno derivatives thereof also having physiological activity. My new method for preparing cis-androsterone may be stated briefly to be, direct conversion of beta-cholestanol to epi-halogeno-cholestane, oxidation of the latter to cis-halogeno-androsterone and hydrolysis of cis-halogeno-androsterone to cis-androsterone itself. The cis-halogeno-androsterones produced during this synthesis of cis-androsterone are new compounds and the method of obtaining the same is also new, as mentioned above. The cis-halogeno-androsterones are not only useful as new intermediates, but they have a physiological action of their own, such as that of cis-chloro-androsterone, which has a distinct action promoting capon-comb growth similarly to cis-androsterone itself.

My invention will be more easily understood by reference to the following formulas and arrows indicating the essential transformations:

I. Preparation of halogeno-cholestanes.
  a. Epi-halogeno-cholestane from beta-cholestanol.

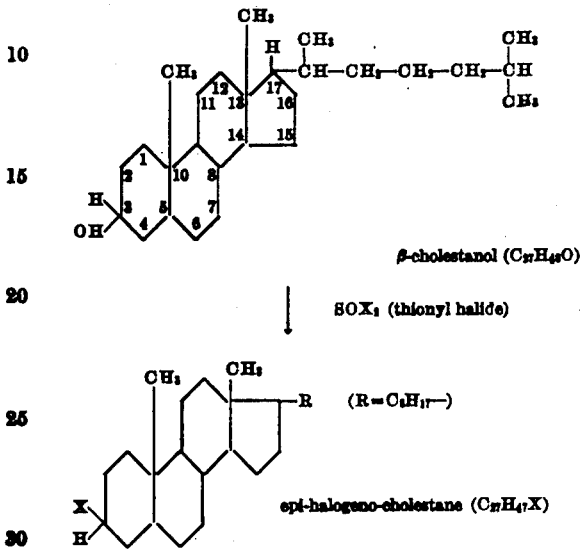

b. Beta-halogeno-cholestane from epi-cholestanol.

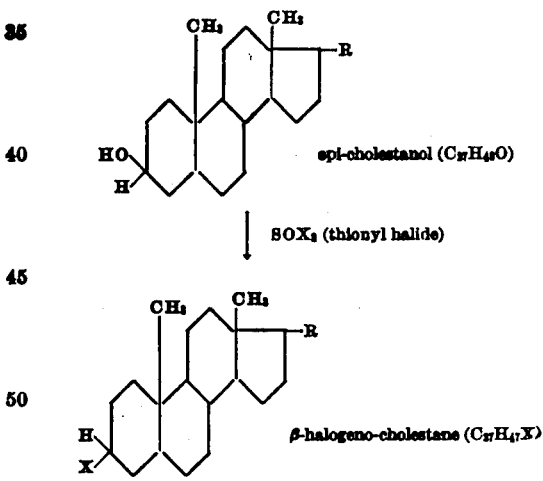

II. Preparation of new 3-halogeno-cis-androsterones.

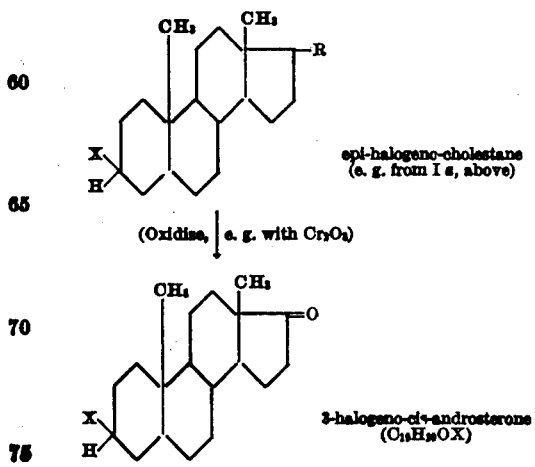

III. Preparation of cis-androsterone.

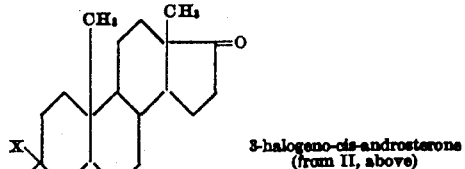

(Hydrolyze, e. g. with NaOH)

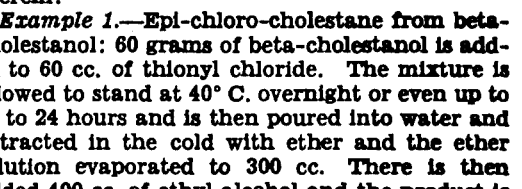

The following examples are given by way of illustrating the invention and are not to be considered as limiting the invention to the specific materials or details of procedure disclosed therein:

*Example 1.*—Epi-chloro-cholestane from beta-cholestanol: 60 grams of beta-cholestanol is added to 60 cc. of thionyl chloride. The mixture is allowed to stand at 40° C. overnight or even up to 20 to 24 hours and is then poured into water and extracted in the cold with ether and the ether solution evaporated to 300 cc. There is then added 400 cc. of ethyl alcohol and the product is cooled in ice-salt mixture. The epi-chloro-cholestane crystallizes out and may be filtered off. The crystals of epi-chloro-cholestane are then taken up and recrystallized from acetone two times. After working up the mother liquors, a total of 46 grams of epi-chloro-cholestane melting above 107° C. is obtained. By recrystallizing this product from alcohol-ether and then twice from acetone a melting point of 110–111° C. is obtained.

*Example 2.*—Beta-chloro-cholestane from epi-cholestanol: In this example epi-chloestanol is converted to beta-chloro-cholestane. It is immaterial from what source the epi-cholestanol is obtained as long as it is of sufficient purity for use in the invention. Beta-cholestanol may be oxidized to beta-cholestanone according to the method of Vavon and Jakubowicz, Bull. Soc. Chim. (4) 53, 584 (1933), and the beta-cholestanone then reduced in dibutyl ether solution by hydrogen, using a reduced platinum oxide catalyst and a small amount of hydrobromic acid. The reduced solution is filtered from the catalyst and concentrated under reduced pressure to separate out crystalline epi-cholestanone.

3 grams of epi-cholestanol melting at 184° C. is mixed thoroughly and dissolved in 5 cc. of thionyl chloride and allowed to stand at 40° C. overnight after which the reactants are poured on water and extracted with ether. The ether is evaporated from the separated ether layer until the reaction mixture has a volume of about 20 cc. 30 cc. of alcohol is added and the mixture cooled by an ice-salt mixture to cause precipitation of the beta-chloro-cholestane. The crystals are filtered off and taken up in and recrystallized from alcohol-ether mixture twice and finally crystallized from acetone solution to give crystals of beta-chloro-cholestane having a melting point of 100° C.

*Example 3.*—Preparation of 3-chloro-cis-androsterone from 3-epi-chloro-cholestane: 3-epichloro-cholestane is used in this example and may be prepared as described above under Example 1 or by the action of phosphorus pentachloride upon epi-cholestanol. 50 grams of epi-chloro-cholestane is dissolved in 2 liters of glacial acetic acid at 90° C. During a period of 4 hours a solution of 104 grams of chromic acid in 400 cc. of 80% acetic acid is added with stirring at 90° C. The reaction mixture is heated an additional five or six hours, cooled, and 50 cc. of ethyl alcohol added. After stirring the mixture for an hour, it is allowed to stand overnight. The acetic acid is evaporated under reduced pressure to give a tarry residue. This is shaken with 500 cc. of water and 500 cc. of ether. The ethereal layer is separated and shaken with an excess of dilute sodium hydroxide solution which causes the separation of the insoluble salt of epi-chloro-cholanic acid. The mixture with insoluble salt is extracted with ether and the ether evaporated to 100 cc. About 300 cc. of alcohol is then added which causes any unoxidized epi-chloro-cholestane to precipitate. After filtering off any of the latter compound, the filtrate is concentrated and then steam distilled to rid it of volatile matter. The residue is then taken up in 100 cc. of ethyl alcohol, filtered, and 5 grams of semi-carbazide acetate added. The product is then heated for an hour, allowed to stand 24 hours at 0° C., filtered, and the residue on the filter washed with ether, boiled with water for 30 minutes and filtered. The residue on the filter is taken up in alcohol-chloroform mixture and after crystallization from this mixture, dried. A melting point of 272–273° C. is obtained for these crystals of epi-chloro-androsterone semi-carbazone (semi-carbazone of 3-chloro-cis-androsterone). A total yield of 6 grams of the semi-carbazone is thus obtained. The 6 grams of 3-chloro-cis-androsterone semi-carbazone is then added to 150 cc. of alcohol containing 30 cc. of hydrochloric acid and refluxed for about 10 hours. The alcohol is evaporated, water added and the product extracted with ether. The ethereal layer is separated, washed with water, treated with active carbon (e. g. "Norit") and filtered. The 3-chloro-cis-androsterone is obtained by evaporating off the ether, taking up in methyl alcohol and re-crystallizing therefrom, separating the crystals from the mother liquor and drying to obtain a purified product melting at 159–161° C. This product possesses male sex hormone physiological properties.

It is of course to be understood that by starting with some other epi-halogeno-cholestane than epi-chloro-cholestane, such as the corresponding bromo or iodo compounds, that the final product will be the corresponding 3-halogeno-cis-androsterone, such as the 3-bromo- or the 3-iodo-cis-androsterone.

*Example 4*.—Hydrolysis of 3-halogeno-cis-androsterone to cis-androsterone: This example is carried out by hydrolyzing off the halogen from a 3-halogeno-cis-androsterone by the use of any suitable hydrolyzing agent to replace the halogen by hydroxyl with the production of cis-androsterone. For example, the final chloro product of Example 3 can be hydrolyzed with aqueous sodium hydroxide solution and the cis-androsterone produced may be extracted with a known water immiscible solvent for cis-androsterone, after which the cis-androsterone may be crystallized from its concentrated solution by cooling and filtering to give a product which when dry is identical with the cis-androsterone obtained from natural sources.

What I claim as my invention is:

1. In the process for the preparation of cis-androsterone from beta-cholestanol, the combination of steps comprising reacting beta-cholestanol with a thionyl halide to produce the corresponding epi-halogeno-cholestane, oxidizing the epi-halogeno-cholestane to cis-halogeno-androsterone and hydrolyzing the latter to cis-androsterone.

2. In the process for the manufacture of cis-androsterone from beta-cholestanol, the combination of steps comprising reacting beta-cholestanol with thionyl chloride to produce 3-epi-chloro-cholestane, oxidizing the 3-epi-chloro-cholestane to cis-chloro-androsterone and hydrolyzing the latter to cis-androsterone.

3. Process for the preparation of halogeno-cholestanes which comprises reacting a cholestanol with a thionyl halide to replace the alcoholic hydroxyl of the cholestanol by halogen and at the same time produce spatial inversion on the carbon atom to which said hydroxyl was attached.

4. Process for the preparation of a chloro-cholestane comprising reacting a cholestanol with thionyl chloride to replace the alcoholic hydroxyl by chlorine and at the same time produce spatial inversion on the carbon atom to which said hydroxyl was attached.

5. Process for the preparation of 3-epi-halogeno-cholestane which comprises reacting beta-cholestanol with a thionyl halide to replace the alcoholic hydroxyl of the beta-cholestanol by halogen and at the same time produce spatial inversion on the carbon atom to which said hydroxyl was attached.

6. Process for the preparation of 3-epi-chloro-cholestane which comprises reacting beta-cholestanol with thionyl chloride to replace the alcoholic hydroxyl of the beta-cholestanol by chlorine and at the same time produce spatial inversion on the carbon atom to which said hydroxyl is attached.

RUSSELL EARL MARKER.